US005376931A

United States Patent [19]

Marrs

[11] Patent Number: 5,376,931

[45] Date of Patent: Dec. 27, 1994

[54] DEBIT MESSAGE AUTHORIZATION SYSTEM FOR RADIO RECEIVERS

[75] Inventor: Michael R. Marrs, Parkland, Fla.

[73] Assignee: Motorola, Inc., Schaumburg, Ill.

[21] Appl. No.: 822,765

[22] Filed: Jan. 21, 1992

[51] Int. Cl.[5] .......... H04Q 1/00

[52] U.S. Cl. .......... 340/825.44; 340/825.33; 379/91; 379/111; 379/114

[58] Field of Search .......... 340/311.1, 825.44, 825.47, 340/825.48, 825.26, 825.27, 825.33; 379/91, 111, 112, 114; 358/84; 455/2, 352

[56] References Cited

U.S. PATENT DOCUMENTS

| | | | |
|---|---|---|---|
| 4,706,272 | 11/1987 | Nishimura et al. | 340/825.44 |
| 4,870,403 | 9/1989 | Mori et al. | 340/825.44 |
| 4,910,510 | 3/1990 | Davis et al. | 340/825.44 |
| 5,049,874 | 9/1991 | Ishida et al. | 340/825.44 |
| 5,138,650 | 8/1992 | Stahl et al. | 379/114 |

*Primary Examiner*—Donald J. Yusko

*Assistant Examiner*—Brian Zimmerman

*Attorney, Agent, or Firm*—Keith A. Chanroo; John H. Moore

[57] ABSTRACT

A radio receiver (50) for establishing a message debiting system has a receiver (54) for receiving message information and a memory (104) for storing the received message information to be presented to a user of the radio receiver (50). The radio receiver (50) includes a debit meter (72) which indicates a number of available credit units for enabling the presentation of the stored message information. The stored message information is processed a decoder/controller (56) and a number of debit units is calculated from a parameter of the stored message information. The number of debit units of the stored message is debited from the indicated number of credit units of the debit meter to enable the presentation of the stored message information. The stored message is disabled from being presented to the user when the number of available credit units of the debit meter (72) is depleted.

19 Claims, 4 Drawing Sheets

DEBIT MESSAGE AUTHORIZATION SYSTEM FOR RADIO RECEIVERS

FIELD OF THE INVENTION

This invention relates in general to radio receivers and more specifically to a method for establishing a message debiting system in a radio receiver.

BACKGROUND OF THE INVENTION

Currently in paging systems, the subscribers are generally charged (billed) at a fixed monthly rate by the service providers (carriers) for the cost of providing service. Included in this fixed monthly charge is the cost of generating the monthly invoices which artificially increases the cost of providing service. As will be illustrated below, the additional monthly charge for generating monthly invoices has foreclosed some users from continuing their subscriptions or from initiating subscription to current selective call receiver (paging) systems.

For example, selective call receiver systems in the United States are currently serving over twelve million subscribers. Of the twelve million subscribers, about three-percent are discontinuing their subscriptions on a monthly basis. Two-thirds of the three-percent subscribers who have discontinued their subscriptions have reconnected service with other carriers. However, the other one-third of the three-percent of subscribers have stated that they have discontinued their services because the monthly fixed charge is too high to justify the low usage of their selective call receivers (pagers).

Accordingly, there exists a need to reduce the cost of providing service such that the carriers can attract and maintain the occasional (low message volume) users of the system. Therefore, by eliminating the monthly administrative and invoicing costs, carriers may be able to provide service at a rate that is cost-effective for attracting the subscribers who are occasional users of the system.

SUMMARY OF THE INVENTION

A radio receiver for establishing a message debiting system has a receiver for receiving message information and a memory for storing the received message information to be presented to a user of the radio receiver. The radio receiver includes a debit meter which indicates a number of available credit units for enabling the presentation of the stored message information. The stored message information is processed and a number of debit units is calculated from a parameter of the stored message information. The number of debit units of the stored message is debited from the indicated number of credit units of the debit meter to enable the presentation of the stored message information. The stored message is disabled from being presented to the user when the number of available credit units of the debit meter is depleted.

DESCRIPTION OF A PREFERRED EMBODIMENT

Figure 1:
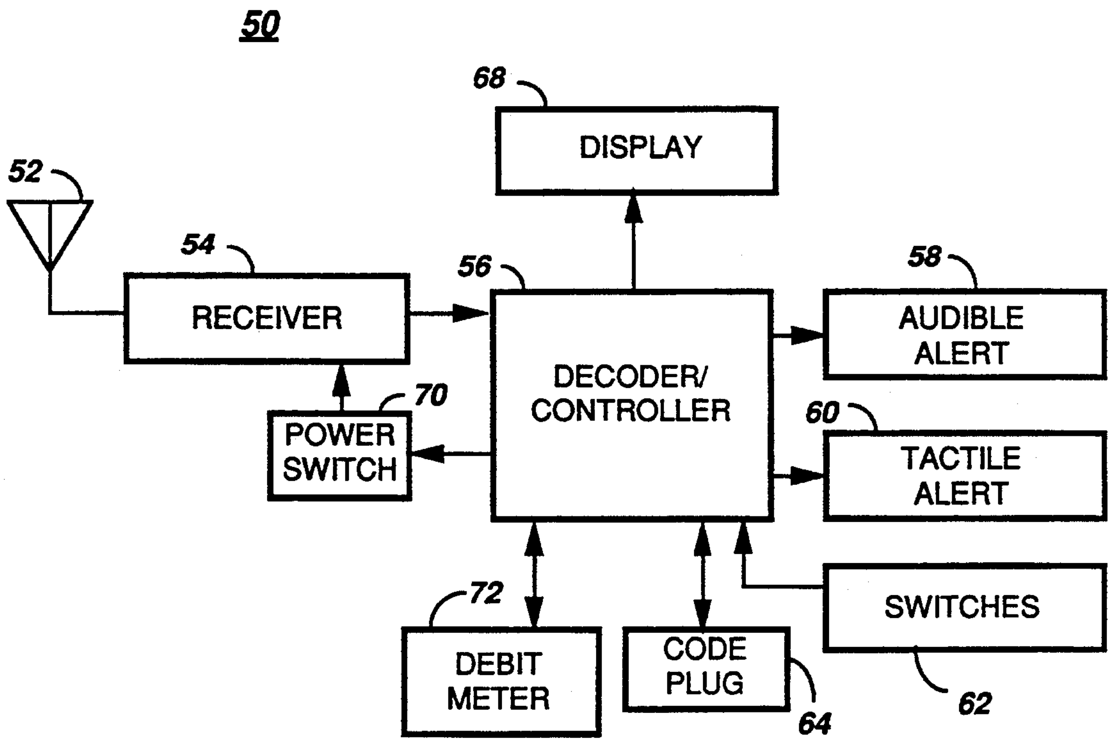
FIG. 1 is an electrical block diagram of a selective call receiver in accordance with the preferred embodiment of the present invention.

FIG. 1 is an electrical block diagram of a selective call receiver in accordance with the preferred embodiment of the present invention. The selective call receiver 50 comprises an antenna 52 for intercepting transmitted radio frequency (R.F.) signals which are coupled to the input of a receiver 54. The R.F. signals are preferably selective call (paging) message signals which provide a receiver address and an associated message, such as numeric or alphanumeric message. However, it will be appreciated that other well known paging signaling formats, such as tone only signaling or tone and voice signaling, would be suitable for use as well. The receiver 54 processes the R.F. signal and produces at the output a data stream representative of a demodulated address and message information. The demodulated address and message information are coupled into the input of a decoder/controller 56 which processes the information in a manner well known in the art. A power switch 70, coupled to the decoder/controller 56, is used to control the supply of power to the receiver 54, thereby providing a battery saving function as is well known in the art for use with selective call receivers.

For purposes of this illustration, it will be assumed that the POCSAG signaling format is utilized which is well known in the art, although other signaling formats could be utilized as well. When the address is received by the decoder/controller 56, the received address is compared with one or more addresses stored in a code plug (or code memory) 64, and when a match is detected an alert signal is generated to alert a user that a selective call message, or page, has been received. The alert signal is directed to an audible alerting device 58 for generating an audible alert or to a tactile alerting device 60 for generating a silent vibrating alert. Switches 62 allow the user of the selective call receiver to select between the audible alert 58 and the tactile alert 60 in a manner well known in the art.

The message information which is subsequently received is stored in memory (not shown) and can be accessed by the user for display using one or more of the switches 62 which provide such additional functions as reset, read, and delete, etc. Specifically, by the use of appropriate functions provided by the switches 62, the stored message is recovered from memory and processed by the decoder/controller 56 for displaying by a display 68 which enables the user to view the message.

Figure 2:
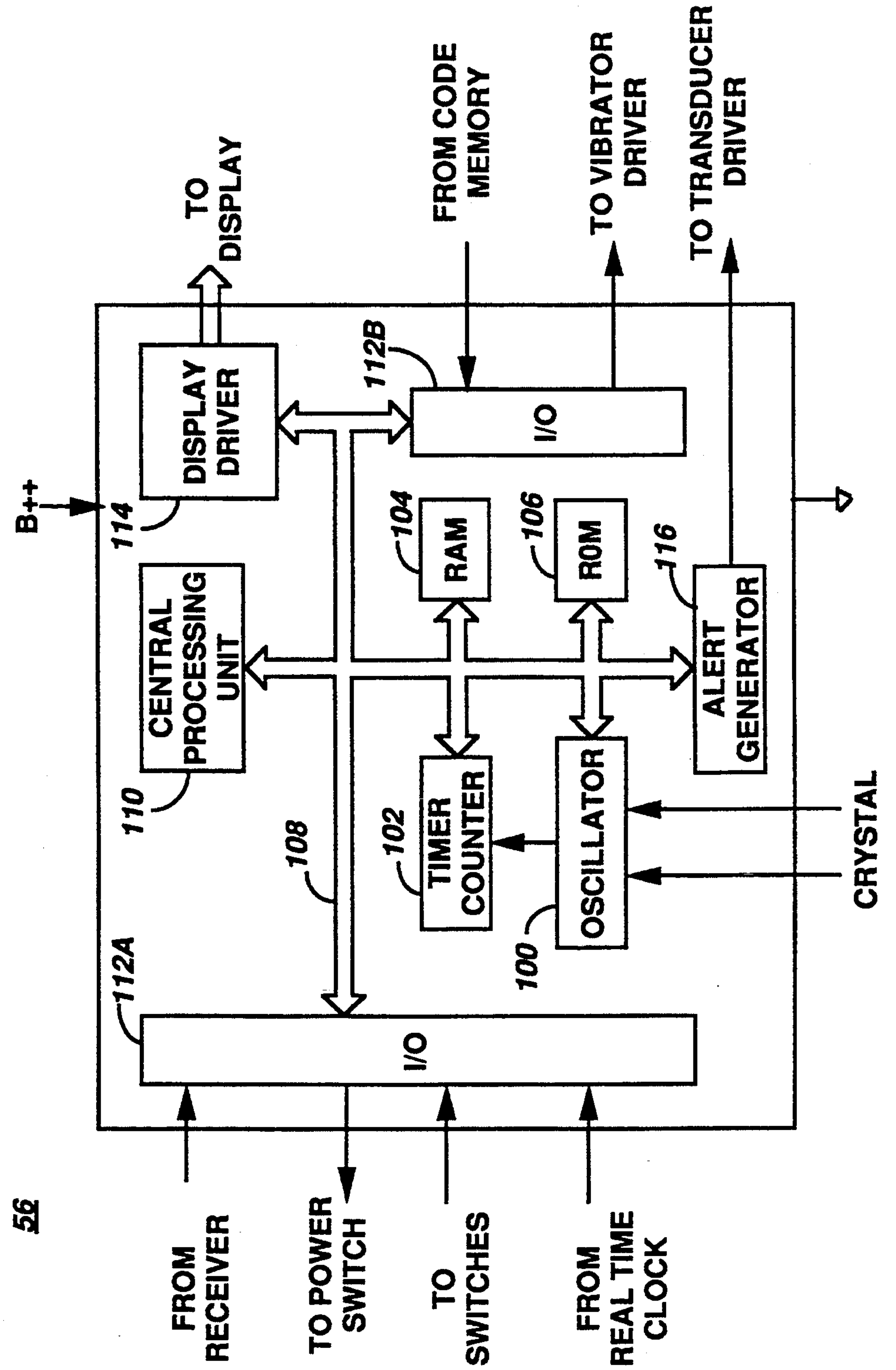
FIG. 2 is an electrical block diagram of the microcomputer used in the selective call receiver of FIG. 1.

The controller/decoder 56 of FIG. 1 can be constructed utilizing a microcomputer as shown in FIG. 2. FIG. 2 is an electrical block diagram of a microcomputer based decoder/controller suitable for use in the selective call receiver of FIG. 1. As shown, the microcomputer 56 is preferably an MC68HIC05 microcomputer manufactured by Motorola, Inc. which includes an on-board display driver 114. The Microcomputer 56 includes an oscillator 100 which generates the timing signals utilized in the operation of the microcomputer 56. A crystal, or crystal oscillator (not shown) is coupled to the inputs of the oscillator 100 to provide a reference signal for establishing the microcomputer timing. A timer/counter 102 couples to the oscillator 100 and provides programmable timing functions which are utilized in controlling the operation of the receiver. A RAM (random access memory) 104 is utilized to store variables derived during processing, as well as to provide storage of message information which are received during operation as a selective call receiver. A ROM (read only memory) 106 stores the subroutines which control the operation of the receiver, as is well known to those skilled in the art. It will be appreciated that in many microcomputer implementations, the programmable-ROM (PROM) memory area can be provided by an EEPROM (electrically erasable programmable read only memory). The oscillator 100, timer/counter 102, RAM 104, and ROM 106 couple through an address/data/control bus 108 to a central processing unit (CPU) 110 which performs the instructions and controls the operations of the microcomputer 56.

The demodulated data generated by the receiver is coupled into the microcomputer 56 through an input-/output (I/O) port 112A. The demodulated data is process by the CPU 110, and when the received address is the same as the code-plug memory which couples into the microcomputer through an I/O port 112B, the message, if any, is received and stored in RAM 104. Recovery of the stored message, and selection of the predetermined destination address, is provided by the switches which are coupled to the I/O port 112A. The microcomputer then recovers the stored message, and directs the information over the data bus 108 to the display driver 114 which processes the information and formats the information for presentation by a display such as an LCD (liquid crystal display). At the time a selective call receiver address is received, the alert signal is generated which can be routed through the data bus 108 to an alert generator 116 that generates the alert signal which is coupled to the audible alert device that was described above. Alternatively, when the vibrator alert is selected as described above, the microcomputer generates an alert enable signal which is coupled through data bus 108 to the I/O port 112B to enable generation of a vibratory, or silent alert.

The battery saver operation is control by the CPU 110 with battery saving signals which are directed over the data bus 108 to the I/O port 112A which couples to the power switch. Power is periodically supplied to the receiver to enable decoding of the received selective call receiver address signals and any message information which is directed to the receiver.

Specifically according to the invention, FIG. 1 shows a debit meter 72 which is coupled to the decoder/controller 56 for establishing a message debiting system. The debit meter 72, when fully replenished (e.g., when the debit meter 72 is indicating the total number of available credit units), indicates the available number of credit units for enabling the user of the selective call receiver 50 to access the received message information that is stored in memory. The decoder/controller 56 calculates the number of credit units (or debit units) from a parameter of the stored message, preferably, from the number of characters of the stored message to be presented or displayed. Those skilled in the arts will appreciate that the parameter of the stored message may comprises other variables, such as, a time associated with the displaying or presenting of the message. A charge, in debit units, is preferably assigned to each character of the message, and the decoder/controller 56 counts (accumulates) the number of characters of the message to determine the total number of debit units. This charge, debit units, is preferably calculated at the time the message is stored in memory. The decoder/-controller 56 then debits (subtracts) the total number of message debit units from the number of indicated or available credit units of the debit meter 72. Upon debiting the number of debit units of the stored message from the indicated number of credit units of the debit meter 72, the decoder/controller 56 enables access to the stored message when there is a sufficient number of available credits units in the debit meter 72 (e.g., when the debit meter 72 is not depleted), and disables access to the stored message when the debit meter 72 is depleted. Thus, once the calculated debit units of the received message is debited from the available credit units of the debit meter 72, the message is now available for display to the user at no extra charge irrespective of the number of times the user views the message on the display 68. This is, the stored message is debited only once. The debit meter 72 then indicates the remaining number of credits units available for subsequently received and stored messages.

Figure 3:
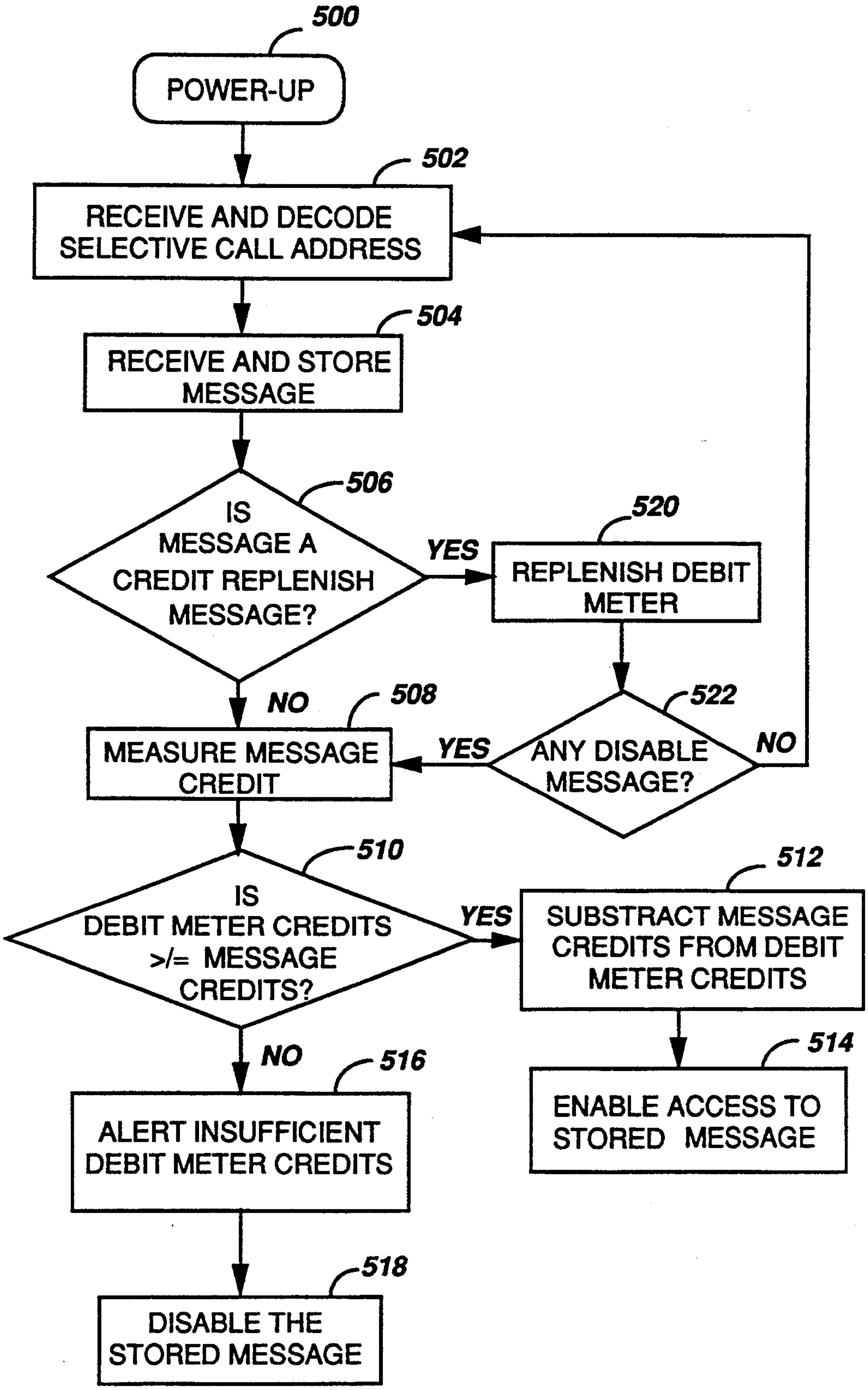
FIG. 3 is a flow diagram illustrating the operation of the selective call receiver according to FIG. 1.

Referring to FIG. 3, a flow diagram is shown for illustrating the operation of the microcomputer based selective call receiver of FIG. 1 for establishing the message debiting system according to the preferred embodiment of the present invention. When the power to the selective call receiver is turned on, step 500 initializes the selective call receiver for receiving message information. Step 502 receives and decodes selective call receiver addresses, and when a match is obtained as described above, a subsequent message directed to the selective call receiver is received and stored (step 504). The stored message is checked to determine if the stored message is a credit replenish message (step 506). A credit replenish message is a message having at least one encoded bit or a unique address, as known to those skilled in the art, for indicating that the message is a credit replenish information. The credit replenish information preferably comprises additional data bits directed to the debit meter for replenishing the depleted debit meter. The credit replenish information additional data bits, preferably indicates or represents the number of credit units to be accumulated to the available credit units of the debit meter. Therefore, at step 506, when the stored message is determined to be a credit replenish information, the number of credits units of the credit replenish information is accumulated to the available, if any, credit units of the debit meter (step 520). Step 522, checks if there are any stored messages that are disabled from access to the user of the selective call receiver. If none is determined, the flow returns to step 502, otherwise, the flow continues to step 508 which will be discussed below.

Therefore, by establishing a method for the selective call receiver to receive credits for enabling the presentation of stored messages, the providers of the selective call receiver service can eliminate the fixed monthly billing and invoicing method of charging subscribers. Specifically, when the selective call receivers are configured to receive and store credits transmitted over-the-air, then depending on the availability of credits, the stored message is enabled or disabled from access by the user. In this way, the users of the selective call receiver, especially occasional users, will pay only for the message received, and when the payments (credits) are depleted, users need only pay when a message is received and locked (disabled) in memory. Thus, eliminating the need for producing monthly charges by way of monthly invoices, the cost to subscribers is reduced because they are not burdened by monthly payments irrespective of the actual use of their selective call receivers.

Again referring to FIG. 3, when the message is determined to be not a credit replenish information (step 506), the number of credits (or debit units) is calculated, preferably, by counting the number of characters to be displayed in the stored message multiplied by a charge-per-character to present the message to the user (step 508). The the number of available credit units of the debit meter is checked to determine if the number of credit units of the debit meter is greater-than-or-equal-to the number calculated debit units of the stored message (step 510). If not greater, the user is alerted that the credit units of the debit meter is depleted (e.g., insufficient number of credits to enable access of the stored message), step 516. The stored message is then disabled from access by the user (step 518). Alternatively, if the credit units of the debit meter is greater, the calculated debit units of the stored message is subtracted or debited from the available credits of the debit meter (step 512), and in step 514, access to the stored message is enabled and remains enabled so that the user can retrieve the stored message.

Additionally, a message may be displayed simultaneously with or subsequently to the alert to inform the user that additional fees are to be paid before the user can access the message stored in memory. Upon payment of the fees or appropriate arrangements, the selective call receiver preferably receives a R.F. signal as described above addressed to that selective call receiver having a message encoded with a credit replenish information for replenishing the available number of credits. In this way, the message is received and stored so that the user does not lose any message because the credit units have been inadvertently depleted.

Figure 4:
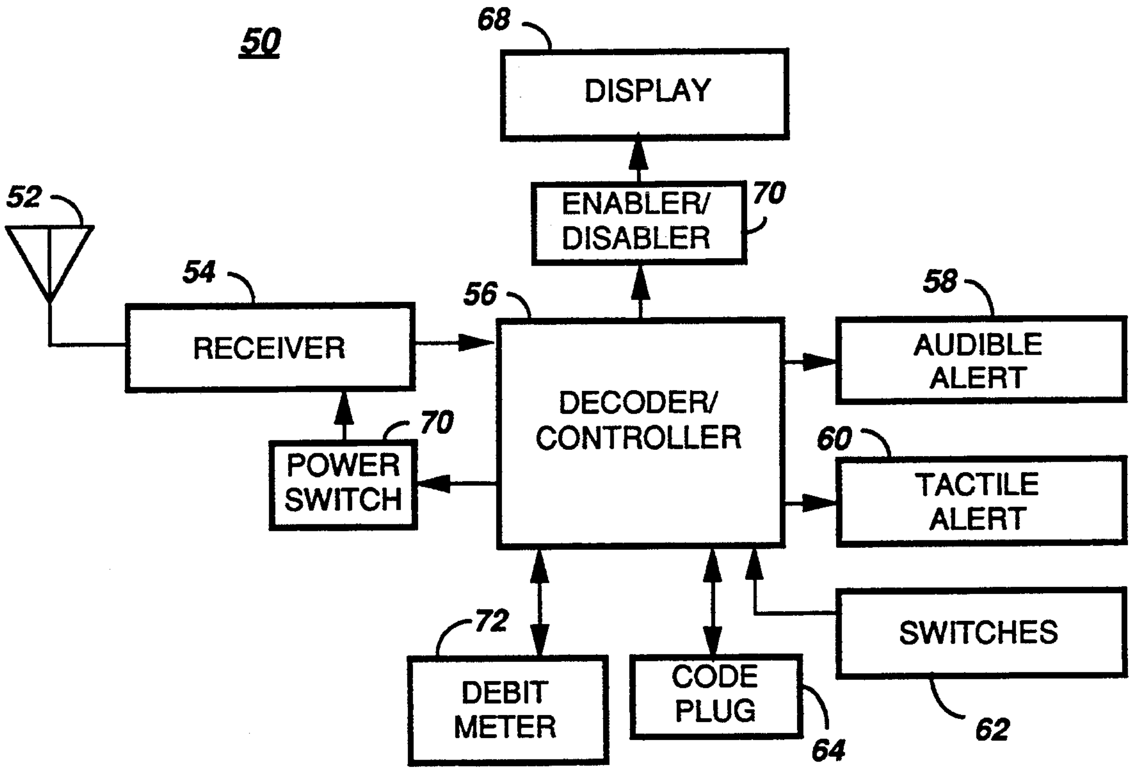
FIG. 4 is an electrical block diagram of a selective call receiver in accordance with a second embodiment of the present invention.

FIG. 4 is an electrical block diagram of a selective call receiver in accordance with a second embodiment of the invention. The second embodiment of the present invention is similar to the preferred embodiment except that the enabling and disabling of the stored message is achieved by enabler/disabler 70 coupled to the decoder/controller 56 and the display 68. In the preferred embodiment, the enabling and disabling of the stored message is achieved in software residing in memory of the microcomputer as discussed above. However, a shown in FIG. 4, a stored message which has more debit credits than credit units of the debit meter 72 is preferably encoded or "tagged" by the decoder/controller 56 to prevent subsequent presentation of the message on the display 68. Thus, any attempt to retrieve the disabled message results in the decoder/controller 56 activating the disabler/enabler 70 which prevents the presentation of the disabled message.

Summarizing, the selective call receiver receives and stores the message and if the number of credits units of the debit meter have not been depleted by previously received messages, the stored message is enabled and remains enabled for presentation by the user. However, if the message credits have been depleted, the user must pay an additional amount which results preferably in a message replenish information directed to the selective call receiver which enables the disabled message for presentation. In this way, the service providers can dispense with the need for generating costly monthly invoices to be sent to subscribers. Furthermore, because the message is stored and disabled from viewing, the subscribers will not lose the ability to receive valuable messages. A telephone call and a credit card can provide access to disabled message almost instantaneously. Accordingly, a lower cost will be passed to the subscribers which will allow the service providers to attract and maintain the subscriptions of occasional users to the current selective call receiver systems.

I claim:

1. A radio receiver for establishing a message debiting system, comprising:

receiver means for receiving message information;

memory means for storing the received message information;

presentation means for presenting the stored message information;

a debit meter for indicating an available number of credit units assigned to said radio receiver;

processing means, coupled to the debit meter and the memory means, for processing the stored message information and for calculating from a parameter of the stored message information a number of debit units to be debited from the available number of credit units of the debit meter for presenting the stored message information to a user; and disabling means, coupled to said debit meter and said memory means, for disabling access to the stored message information when the available credit units of the debit meter is depleted.

2. The radio receiver according to claim 1 wherein said receiver means receives information to replenish the number of available credit units, and said radio receiver further comprising:

determining means for determining when the information to replenish the available credit units is received;

replenishing means for replenishing the available credit units of the debit meter in response to the determining means; and enabling means for enabling access to the stored message information.

3. The radio receiver according to claim 1 further comprising an alerting means for alerting the user of the received message information.

4. The radio receiver according to claim 3 wherein the alerting means also alerts the user when the available credit units of the debit meter is depleted.

5. The radio receiver according to claim 1 wherein the parameter of the stored message information comprises a count of the total number of characters in the stored message information.

6. The radio receiver according to claim 1 wherein the parameter of the stored message information comprises a time for presenting the stored message information.

7. A method for establishing a message debiting system in radio receivers, comprising the steps of:

(a) receiving and storing messages;

(b) presenting the stored messages;

(c) determining a number of debit units from a parameter of the stored message for presenting the stored message to a user of the radio receiver;

(d) debiting the determined number of debit units from the message debiting system indicating a number of credit units; and (e) disabling access for presenting the stored message when the number of credit units of the message debit lug system is depleted.

8. The method according to claim 7 wherein step (a) including receiving a credit replenish information for replenishing the number of credit units of the message debiting system.

9. The method according to claim 7 further comprising the steps of:

determining if the stored message is a credit replenish information;

replenishing the message debiting system; and enabling access to the stored messages for presenting the stored message to the user of the radio receiver.

10. A selective call receiver for establishing a message debiting system, comprising:

receiver means for receiving message information;

memory means for storing the received message information;

presentation means for presenting the stored message information;

a debit meter for indicating an available number of credit units to said selective call receiver;

processing means, coupled to the debit meter and the memory means, for processing the stored message information and for calculating from a parameter of the stored message information a number of debit units for debiting the available number of credit units of the debit meter for presenting the stored message information to a user; and disabling means, coupled to said debit meter and said memory means, for disabling access to the stored message information when the credit units of the debit meter is depleted.

11. The selective call receiver according to claim 10 wherein said receiver means receives information to replenish the number of available credit units, and said radio receiver further comprising:

determining means for determining when the information to replenish the available credit units is received;

replenishing means for replenishing the available credit units of the debit meter in response to the determining means; and enabling means for enabling access to the stored message information.

12. The selective call receiver according to claim 10 further comprising an alerting means for alerting the user of the received message information.

13. The selective call receiver according to claim 12 wherein the alerting means also alerts the user when the available credit units of the debit meter is depleted.

14. The selective call receiver according to claim 10 wherein the parameter of the stored message information comprises a count of the total number of characters in the stored message information.

15. The selective call receiver according to claim 1 wherein the parameter of the stored message information comprises a time associated with presenting the stored message information.

16. A selective call receiver for establishing a message debiting system, comprising:

receiver means for receiving message information;

memory means for storing the received message information;

presentation means for presenting the stored message information;

a debit meter for indicating an available number of credit units assigned to said radio receiver;

processing means, coupled to the debit meter and the memory means, for processing the stored message information and for calculating from a parameter of the stored message information a number of debit units to be debited from the available number of credit units of the debit meter for presenting the stored message information to a user; disabling means, coupled to said debit meter and said memory means, for disabling access to the stored message information when the available credit units of the debit meter is depleted;

said receiver means capable of receiving information to replenish the number of available credit units; and replenishing means coupled to the debit meter for replenishing the available credit units of the debit meter.

17. The selective call receiver according to claim 16 further comprising an enabling means coupled to the memory means for enabling access to the stored message information.

18. The selective call receiver according to claim 16 further comprising determining means coupled to the receiver means for determining when the information to replenish the available credit units is received; and replenishing means coupled to the debit meter for replenishing the available credit units of the debit meter in response to the determining means.

19. A selective call receiver for establishing a message debiting system, comprising:

receiver means for receiving message information;

memory means for storing the received message information;

presentation means for presenting the stored message information;

a debit meter for indicating an available number of credit units assigned to said radio receiver;

processing means, coupled to the debit meter and the memory means, for processing the stored message information and for calculating from a parameter of the stored message information a number of debit units to be debited from the available number of credit units of the debit meter for presenting the stored message information to a user; disabling means, coupled to said debit meter and said memory means, for disabling access to the stored message information when the available credit units of the debit meter is depleted; and said receiver means capable of receiving information to replenish the number of available credit units;

determining means coupled to the receiver means for determining when the information to replenish the available credit units is received;

replenishing means coupled to the debit meter for replenishing the available credit units of the debit meter in response to the determining means; and enabling means coupled to the memory means for enabling access to the stored message information.

* * * * *

UNITED STATES PATENT AND TRADEMARK OFFICE
CERTIFICATE OF CORRECTION

PATENT NO. : 5,376,931

DATED : December 27, 1994

INVENTOR(S) : Michael R. Marrs

It is certified that error appears in the above-identified patent and that said Letters Patent is hereby corrected as shown below:

Claim 7(e), Column 7, line 3, delete "debit lug" and insert --debiting--.

Signed and Sealed this

Twentieth Day of February, 1996

*Attest:*

BRUCE LEHMAN

*Attesting Officer*

*Commissioner of Patents and Trademarks*